(12) United States Patent
Abrigo et al.

(10) Patent No.: US 6,291,617 B1
(45) Date of Patent: Sep. 18, 2001

(54) PEROXIDIC COMPOSITIONS

(75) Inventors: Luciano Abrigo; Carla Beretta; Ezio Montessoro; Michele Merenda, all of Alessandria (IT)

(73) Assignee: Elf Atochem Italia S.r.l., Milan (IT)

( * ) Notice: Subject to any disclaimer, the term of this patent is extended or adjusted under 35 U.S.C. 154(b) by 0 days.

(21) Appl. No.: 09/461,094

(22) Filed: Dec. 14, 1999

(30) Foreign Application Priority Data

Dec. 17, 1998 (IT) ................................. MI98A2711

(51) Int. Cl.⁷ ................. C08F 4/38; C08F 4/34; C01B 15/00
(52) U.S. Cl. ............. 526/227; 525/263; 525/264; 525/313; 252/186.42
(58) Field of Search ..................... 525/263, 264, 525/313; 526/227; 252/186.42

(56) References Cited

U.S. PATENT DOCUMENTS

| | | |
|---|---|---|
| 5,245,084 | 9/1993 | Groepper et al. . |
| 5,292,791 | 3/1994 | Groepper et al. . |
| 5,405,915 | 4/1995 | Hess et al. ............. 525/290 |

FOREIGN PATENT DOCUMENTS

| | | |
|---|---|---|
| 25 53 094 | 8/1976 | (DE) . |
| 25 53 145 | 8/1976 | (DE) . |
| 0 533 089 B1 | 11/1995 | (EP) . |
| 0 785 229 A1 | 7/1997 | (EP) . |
| 838963 | 6/1960 | (GB) . |

*Primary Examiner*—Tae H. Yoon
(74) *Attorney, Agent, or Firm*—Arent Fox Kintner Plotkin & Kahn, PLLC

(57) ABSTRACT

Compositions for the polymer curing, comprising:
 a) one or more organic peroxides and
 b) 3,7-Dimethyl-1,3,6-Octatriene (OCIMENE).

10 Claims, No Drawings

PEROXIDIC COMPOSITIONS

The present invention relates to peroxidic compositions usable for the elastomer and polyolefin curing in general, having an improved scorch resistance without negatively affecting in a meaningful way the curing efficiency.

More specifically it relates to compositions having a longer scorch time as shown by the $ts_5$ and $ts_{10}$ values combined with a good curing density as shown by the MH values and having $t_{90}$ curing times of the same order.

It is well known that organic peroxides are used for the elastomer and polyolefin curing. However it is desirable to have available compositions with higher scorch times in order to increase the compound processability avoiding precuring phenomena.

In order to solve this technical problem organic peroxides having a longer half-time could be used, however this has the drawback to lengthen also the curing times ($t_{90}$), to the detriment, therefore, of the productivity, in order to maintain the same curing value (MH).

Adding additives to the peroxidic compositions to increase the scorch time is also known. See for example DE 2,553,145 and 2,553,094 wherein peroxides with different scorch times are mixed but the drawback is that the curing times become longer with the above mentioned disadvantages.

Also amine-based additives are known, but today they cannot be used any longer since they are considered toxicologically dangerous due to their cancerogenous effects.

There are also known hydroquinones, e.g. di-t-butyl or di-t-amyl, sulphur-based compounds, or antioxidants in general as scorch retardants in the peroxidic curing, in this way however the final properties of the cured product are poor since the MH value becomes worse.

In U.S. Pat. No. 5,292,791 and U.S. Pat. No. 5,245,084 a peroxidic composition having scorch retardant properties is described, which comprises:
 a) a peroxide
 b) an hydroquinone derivative
 c) a curing promoter.

A scorch resistant composition, stable upon storage, is also known from the EP 785,229 in the name of the Applicant wherein a powdered peroxide or in the form of grain or masterbatch is mixed at the time of use with a masterbatch comprising an inhibitor and a curing promoter. In the above compositions of the European Patent Application and of the U.S. Pat. No. '791 and '084 two additives are used. One mainly acts as inhibitor (scorch resistant) but has a negative effect on the curing degree.

In order to maintain the curing degree a curing promoter is added.

From the EP 533,089 peroxidic compositions are known wherein a solid peroxide bis(alpha t-butyl-peroxy-isopropyl)-benzene, known as PEROXIMONO F, is mixed with bis (alpha t-amyl peroxy-isopropyl)-benzene, known as PEROXIMON® 180. Said compositions are liquid also at temperatures of 15° C. or lower and show a low volatility. The advantage of said compositions consisted in having available particularly desired liquid compositions in compounding application according to continous (not batch) processes or in peroxide additions carried out by direct absorption on the polymers. The drawback of these compositions is that even though they maintain good MH values, they are not scorch resistant.

The need was felt to have available compositions with improved scorch time without notably lower the curing density (MH) with comparable $t_{90}$ curing times.

The Applicant has unexpectedly and surprisingly found compositions for the polymer curing which give the above mentioned property combination comprising:
 a) one or more organic peroxides selected from the following general formulae:

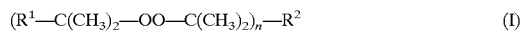

$(R^1\text{---}C(CH_3)_2\text{---}OO\text{---}C(CH_3)_2)_n\text{---}R^2$ (I)

wherein $R^1$ is an alkyl, aryl and aryl-alkyl-substituted group having from 1 to 9 carbon atoms; $R^2$ is selected from phenylene, ethylene, —C≡C—, —C=C—, alkyl, aryl and aryl-alkyl-substituted group; said groups having from 1 to 9 carbon atoms; n is an integer equal to 1 or 2;

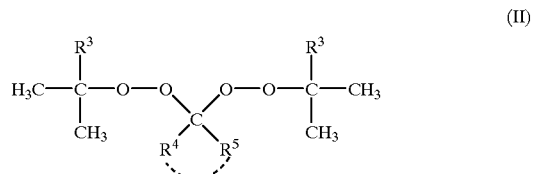

(II)

wherein the two $R^3$ substituents are independently alkyl, aryl, aryl-alkyl-substituted groups having from 1 to 9 carbon atoms, $R^4$ and $R^5$ are independently linear or branched, when possible, alkyl groups, having from 1 to 6 carbon atoms or —$(CH_2)_m$—C(O)OR$^6$ wherein $R^6$ is an alkyl group from 1 to 4 carbon atoms; m is an integer from 1 to 3, or they jointly form a not substituted or substituted cyclohexane or cyclododecane ring with 1 up to 3 alkyl groups having from 1 to 4 carbon atoms; and
 b) 3,7-Dimethyl-1,3,6-Octatriene (OCIMENE).

The preferred type a) components are: dicumylperoxide (PEROXIMONO® (DC)), t-butyl-cumylperoxide (PEROXIMON® 801), bis(α-t-butylperoxyisopropyl)benzene (PEROXIMOND® F), 2,5-di(t-butylperoxy)-2,5-dimethylhexane (Luperoxo 231), 2,5-di(t-butylperoxy)-2,5-dimethylhexine-3 (Luperox® 130), diterbutylperoxide (Luperox® DI), 1,1-di(terbutylpero-xy)-3, 3,5-trimethylcyclohexane (Luperox®101), n-butyl-4,4-di-(terbutylperoxy)valerate (Luperox® 230), 1,1-di-terbutylperoxycyclohexane (Luperox® 331), isopropylcumylterbutylperoxide (PEROXIMON® DC 60), bis(α-teramylperoxyisopropyl)benzene (PEROXIMON® 180). All these peroxides are commercialized by Elf Atochem.

The component b) amount for one hundred parts by weight (100 phr) of elastomer or polyolefin to be cured is in the range 0.05–1.7, preferably 0.1–1.3.

The weight ratio between the component a) and the component b) is in the range 1:0.02 to 1:0.7, preferably 1:0.05 and 1:0.6.

The compound b) is usually a mixture of isomers cis/trans as sold by Fluka in the name of ocimene.

It is also possible to prepare formulations (in inert fillers and/or predispersions in a polymer) containing the (a+b) mixture in an amount generally higher than or equal to 30% to be used as additives to be dispersed in the polymer to be cured. The preferred range for said formulations is from 30 to 70% of (a+b) mixture. Said formulations are well known and can be prepared according to EP 785,229 herein incorporated by reference.

The polymers which can be cured according to the present invention are ethylene-based polymers. More specifically polyethylene having average, low, high density, polybutene-1, ethylene/vinyl-acetate copolymers, acrylic ester/ ethylene copolymers, ethylene/propylene copolymers, ethylene/butene-1 copolymers, ethylene/4-methyl-pentene-1 copolymers and propylene/butene-1 copolymers; furthermore ethylene/propylene EP or EPDM type elastomeric polymers or copolymers, butyl rubber, chlorinated polyethylene and propylene/butene-1 copolymer, can be mentioned. Also mixtures of two or more polymers can be used.

The final compound ready for curing (polymer+peroxide a)+additive b)+mineral and non mineral fillers, antioxidants, curing coagents, etc., see the above mentioned EP 785,229, is preferably used to produce manufactured articles extruded in a continous way and/or injection and/or compression molded.

Curing can be carried out by heat and can be directly performed in the molding in the case of compression or injection molding; in the case of continuous extrusion with the known methods, for example vapour, nitrogen, melted salt baths, autoclaves curing lines, etc.

The polymer characterization in terms of scorch resistance ($ts_5$ and $ts_{10}$), curing rate ($t_{90}$) and curing density (MH) of the cured product, is reported in Example 1.

The following examples are given for illustrative purposes and they are not limitative of the present invention.

EXAMPLE 1

A blend was prepared by mixing 100 g of low density polyethylene (produced by ELF ATOCHEM, commercialized as LACQTENEO® 1020 FN 24), under the form of fine powder, and 2.5 g of dicumylperoxide (PEROXIMON® DC) and 0.3 g of 3,7-Dimethyl-1,3,6-Octatriene (OCIMENE).

The blend was prepared in a V mixer at 50° C. for 60 minutes.

The resulting blend was characterized by using a rheometer (α-Technologies and commercialized as ODR 2000) and a Mooney viscometer for the scorch tests (MV 2000 α-Technologies).

MH and $t_{90}$ have been obtained by the ODR curve at 180° C. (oscillation arc 3°, oscillation frequency 100 cycles/min.). The $ts_5$ and $ts_{10}$ scorch times have been obtained by the scorch curve carried out by the viscometer MV 2000 at 160° C.

The $t_{90}$ term means the necessary time to reach a curing equal to 90% respectively of the curing curve maximum. MH represents the maximum couple on the same curve.

By $ts_5$ and $ts_{10}$ scorch time, the necessary time to obtain a viscosity increase of 5 or 10 Mooney units, with respect to the minimum value, is meant.

The results are shown in Table 1.

EXAMPLE 1A (comparative)

The procedure of Example 1 has been repeated without using the component b) 3,7-Dimethyl-1,3,6-Octatriene (OCIMENE).

The results are reported in Table 1.

By comparing Example 1 with Example 1A it is noticed that Example 1 shows a good MH value, with comparable $t_{90}$, but the scorch time is clearly higher with the invention composition.

EXAMPLE 2

Example 1 has been repeated but using 1 g of component b).

The results are shown in Table 1.

The comparison with the results of Example 1 and 1A shows an improvement of the scorch time and MH values which have not substantially worsened.

TABLE 1

| Ex. No. | Peroxide (comp a)) (g) | Comp. b) (g) | $ts_5$ (s) | $ts_{10}$ (s) | $t_{90}$ (s) | MH (lb. inch) |
|---|---|---|---|---|---|---|
| 1 | DC 2.5 | 0.3 | 281 | 372 | 395 | 18.72 |
| 1A | DC 2.5 | 0 | 192 | 218 | 377 | 21.7 |
| 2 | DC 2.5 | 1 | 339 | 390 | 388 | 18.73 |

EXAMPLES 3–9

Example 1 has been repeated but by using the amount of the peroxide compound (DC) and component b) reported in Table 2.

The blend was characterized by the measurement of $ts_5$ at 145° C. with the Mooney viscosimeter of Example 1.

TABLE 2

| Ex. No. | Peroxide (DC) (g) | Comp. b) (g) | $ts_5$ (145° C.) |
|---|---|---|---|
| 3 | 2.0 | 0 | 548 |
| 4 | 2.0 | 0.3 | 790 |
| 5 | 2.0 | 1.0 | 1080 |
| 6 | 2.0 | 1.5 | 1368 |
| 7 | 1.5 | 0 | 661 |
| 8 | 1.5 | 0.3 | 1057 |
| 9 | 1.5 | 1.0 | 1552 |

The data in Table 2 show that the additive b) provides an umproved scorch protection ($ts_5$) at 145° C. This is extremely relevant since a temperature around 145° C. is the processing temperature of the final compound to obtain manufactured articles by extrusion.

This allows the user of this technology to enhance the productivity and the final product stability during the extrusion process.

EXAMPLE 3A–9A (comparatives)

The procedure of Examples 3–9 has been repeated using as the component b) trans,trans-2,6-dimethyl-2,4,6-octatriene.

The results are shown in Table 2A.

TABLE 2A

| Ex. No. | Peroxide (DC) (g) | Comp. b) (g) | $ts_5$ (145° C.) |
|---|---|---|---|
| 3A | 2.0 | 0 | 548 |
| 4A | 2.0 | 0.3 | 778 |
| 5A | 2.0 | 1.0 | 1025 |
| 6A | 2.0 | 1.5 | 1327 |
| 7A | 1.5 | 0 | 661 |
| 8A | 1.5 | 0.3 | 1012 |
| 9A | 1.5 | 1.0 | 1380 |

The results of Table 2A show that in comparative examples 3A–9A $ts_5$ is lower, at a same concentration of component b), than the corresponding examples according to the present invention.

What is claimed is:

1. A composition suitable for polymer curing comprising:
a) one or more organic peroxides selected from the following general formulae:

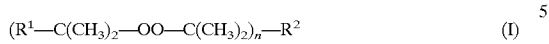  (I)

wherein $R^1$ is an alkyl, aryl and aryl-alkyl-substituted group having from 1 to 9 carbon atoms, $R^2$ is selected from the group consisting of phenylene, ethylene, —C=C—, —C≡C—, alkyl, aryl and aryl-alkyl-substituted group; said groups having from 1 to 9 carbon atoms; n is an integer equal to 1 or 2; and

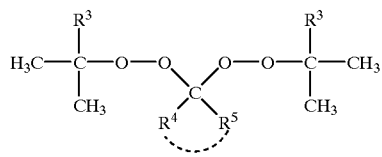  (II)

wherein the two $R^3$ substituents are independently alkyl, aryl, aryl-alkyl-substituted groups having from 1 to 9 carbon atoms, $R^4$ and $R^5$ are independently linear or branched, when possible, alkyl groups, having from 1 to 6 carbon atoms or
—C(CH$_2$)$_m$—C(O)OR$^6$ wherein $R^6$ is an alkyl group from 1 to 4 carbon atoms; m is an integer from 1 to 3, or they jointly form an unsubstituted or a substituted cyclohexane or cyclododecane ring with 1 up to 3 alkyl groups having from 1 to 4 carbon atoms; and
b) 3,7-Dimethyl-1,3,6-Octatriene.

2. The composition according to claim 1 wherein the component a) is selected from:
dicumylperoxide, t-butyl-cumylperoxide, bis(α-t-butylperoxyisopropyl)benzene, 2,5-di(t-butylperoxy)-2,5-dimethylhexane, 2-5-di(t-butylperoxy)-2,5-dimethylhexine-3,diterbutylperoxide, 1,1-di(terbutylperoxy)-3,3,5-trimethylcyclohexane, n-butyl-4,4-di(terbutylperoxy)valerate, 1,1-di-terbutylperoxycyclohexane, isopropylcumylterbutylperoxide and bis(α-teramylperoxyisopropyl)benzene.

3. The composition according to claim 1 wherein the weight ratio between the component a) and the component b) is in the range 1:0.02 to 1:0.7.

4. A composition comprising a polymer to be cured and the composition according to claim 1 and optionally mineral and non mineral fillers, antioxidants and/or curing coagents.

5. The composition according to claim 4 wherein the component b) amount for one hundred parts by weight (100 phr) of polymer to be cured is in the range 0.05–1.7.

6. The composition according to claim 5 wherein the component b) amount for one hundred parts by weight (100 phr) of polymer to be cured is in the range 0.01–1.3.

7. The composition according to claim 4 wherein the polymer to be cured is selected from the group consisting of polymers based on ethylene, poly-butene-1 and propylene/butene-1 copolymers.

8. The composition according to claim 7 wherein the ethylene-based polymer to be cured is selected from the group consisting of polyethylene having average, low, high density, ethylene/vinyl-acetate copolymers, acrylic ester/ethylene copolymers, ethylene/propylene copolymers, ethylene/butene-1 copolymers and ethylene/4-methyl-pentene-1 copolymers.

9. The composition according to claim 4 wherein the polymer to be cured is selected from the group consisting of ethylene/propylene or ethylene/propylene/diene elastomeric polymers or copolymers, butyl rubber, chlorinated polyethylene and propylene/butene-1 copolymer.

10. The composition according to claim 3 wherein the weight ratio between the component a) and the component b) is in the range 1:0.05 to 1:0.6.

* * * * *